United States Patent [19]

Maebayashi et al.

[11] Patent Number: 5,450,589
[45] Date of Patent: Sep. 12, 1995

[54] FIRMWARE MODIFICATION SYSTEM WHEREIN OLDER VERSION CAN BE RETRIEVED

[75] Inventors: Masato Maebayashi, Yokohama; Makoto Kimura, Inba, both of Japan

[73] Assignee: Fujitsu Limited, Kanagawa, Japan

[21] Appl. No.: 364,035

[22] Filed: Dec. 27, 1994

Related U.S. Application Data

[63] Continuation of Ser. No. 748,922, Aug. 23, 1991, abandoned.

[30] Foreign Application Priority Data

Aug. 23, 1990 [JP] Japan ................. 2-221795

[51] Int. Cl.⁶ ........................................... G06F 9/06
[52] U.S. Cl. ......................................... 395/700
[58] Field of Search ............ 395/575, 600, 700; 371/19; 364/DIG. 1 MS File

[56] References Cited

U.S. PATENT DOCUMENTS

| | | | |
|---|---|---|---|
| 5,086,502 | 4/1992 | Malcolm | 395/575 |
| 5,202,984 | 4/1993 | Kashio | 395/600 |
| 5,241,672 | 8/1993 | Slomeenski et al. | 395/600 |

*Primary Examiner*—Thomas M. Heckler
*Attorney, Agent, or Firm*—Staas & Halsey

[57] ABSTRACT

A firmware modification system in a data processing apparatus, containing a processor for executing a program and a working program holding unit for holding therein data of the program executed by the processor. The system also includes fixed program data storing unit for storing a fixed program data and a modification data storing unit for storing modification data with which the fixed program data is to be modified, where the modification data storing unit is accessible from outside of the data processing apparatus for writing the modification data therein. A fixed program data loading unit is used for reading from the fixed program data storing unit, and loading the fixed program data in the working program holding unit to hold the fixed program data therein, and a working program modifying unit is used for modifying data of the program which is held in the working program holding unit, with the modification data stored in the modification data storing unit.

7 Claims, 19 Drawing Sheets

Fig. 7

CONTENT OF HEADER

| | BYTE 0 | BYTE 1 | BYTE 2 | BYTE 3 |
|---|---|---|---|---|
| 0 | FIXED VALUE ("DBLK") | | | |
| 1 | CURRENT VERSION TO BE MODIFIED | | NEW VERSION | |
| 2 | SIZE OF BLOCK | | | |
| 3 | 0 | 0 | | CHECK SUM |

Fig. 8A

CONTENT

| | BYTE 0 | BYTE 1 | BYTE 2 | BYTE 3 |
|---|---|---|---|---|
| 0 | TYPE (00) | ADDRESS | | |
| 1 | OLD DATA | | | |

Fig. 8B

| | BYTE 0 | BYTE 1 | BYTE 2 | BYTE 3 |
|---|---|---|---|---|
| 0 | TYPE (01) | ADDRESS | | |
| 1 | NEW DATA 0 | | NEW DATA 1 | |

Fig. 9

| BYTE 0 | BYTE 1 | BYTE 2 | BYTE 3 |
|---|---|---|---|
| FIXED VALUE "FFFFFFFF" | | | |

Fig. 10A. I/O COMMAND

Fig. 10B. AOPD

Fig. 11

| FNC CODE | OPERATION |
|---|---|
| 0 0 | NEW OPEN |
| 0 1 | APPEND OPEN |
| 0 2 | PUT |
| 0 3 | CLOSE |
| 0 4 | CLEAR |
| 0 5 | VERIFY |

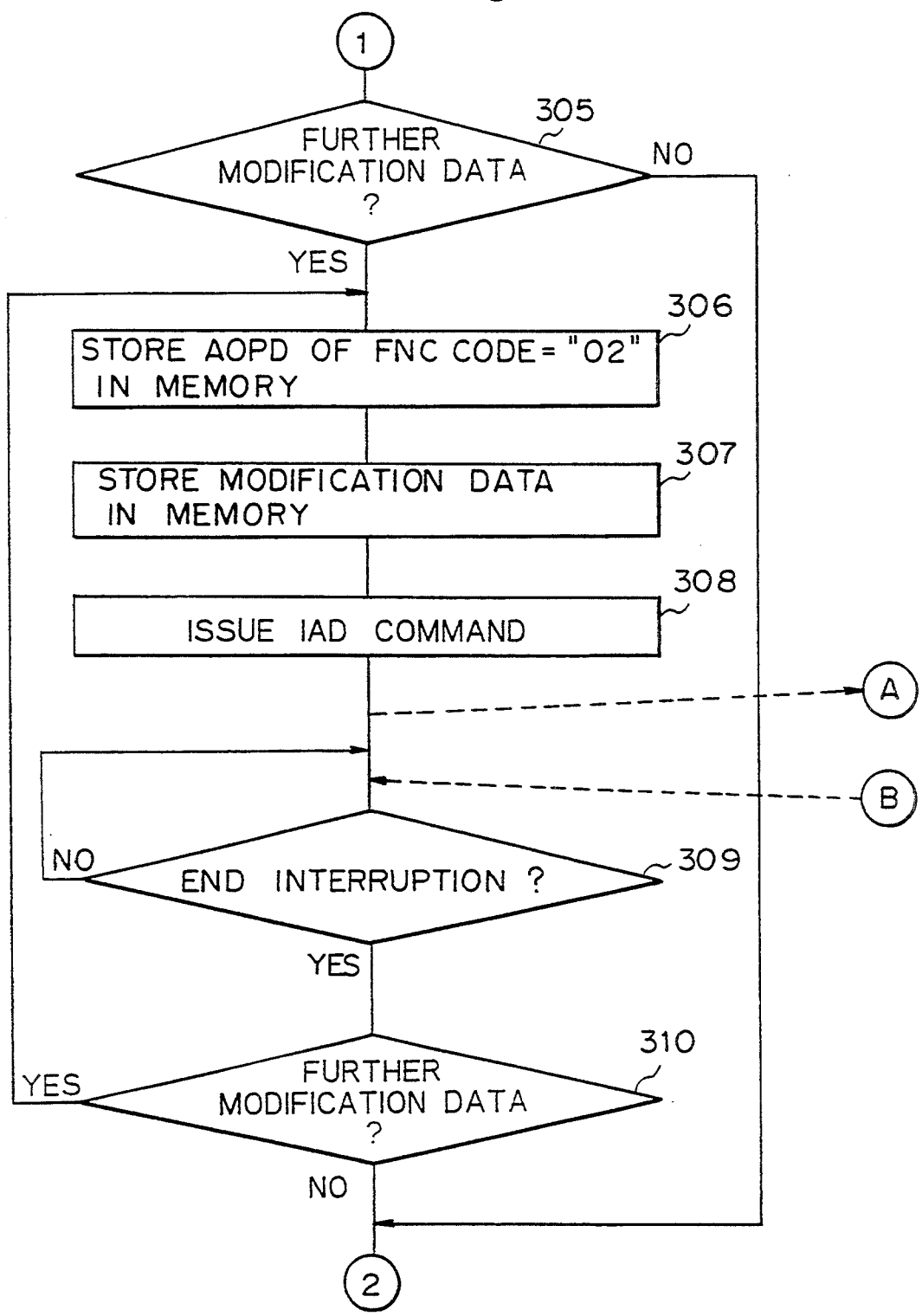

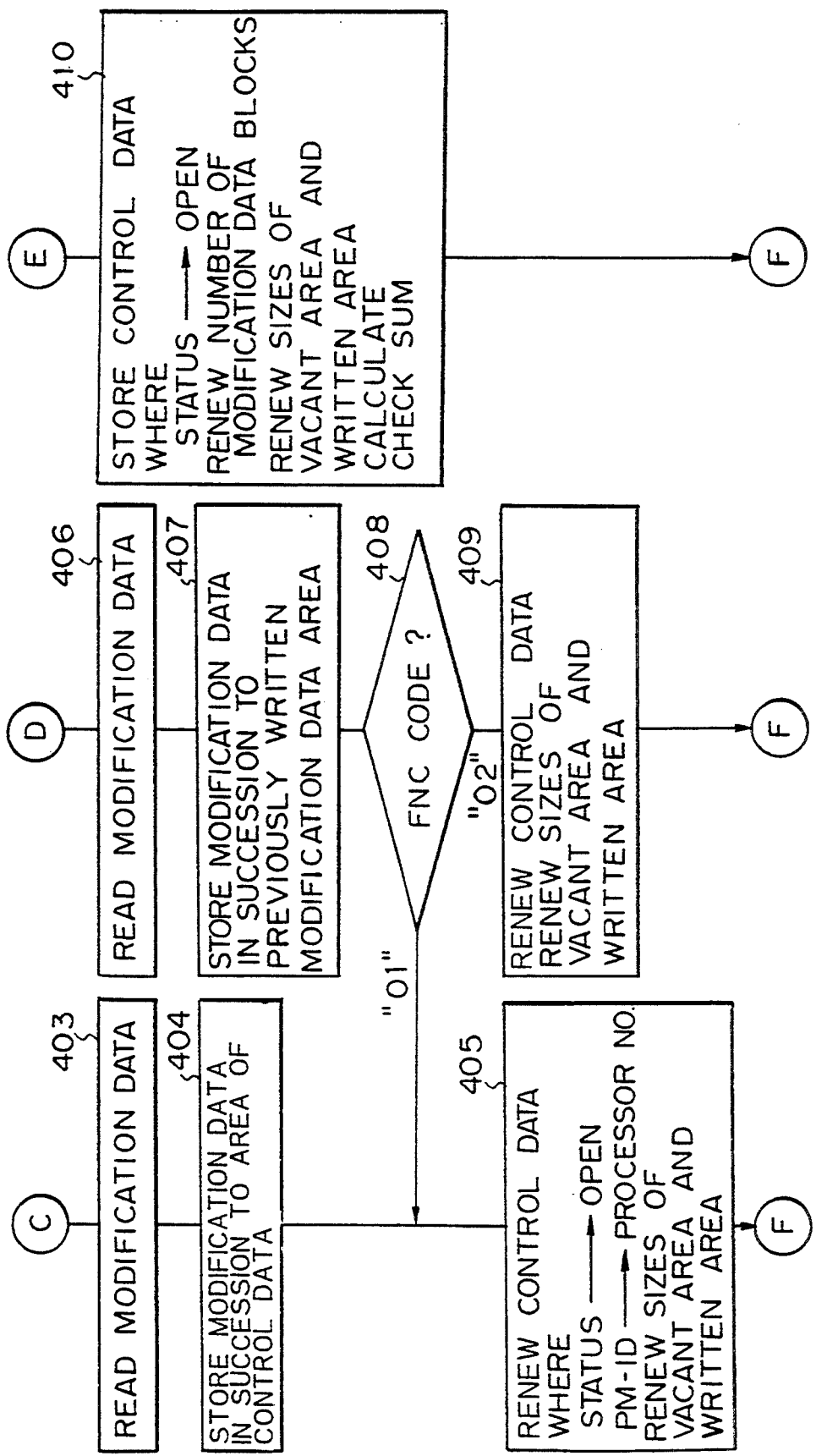

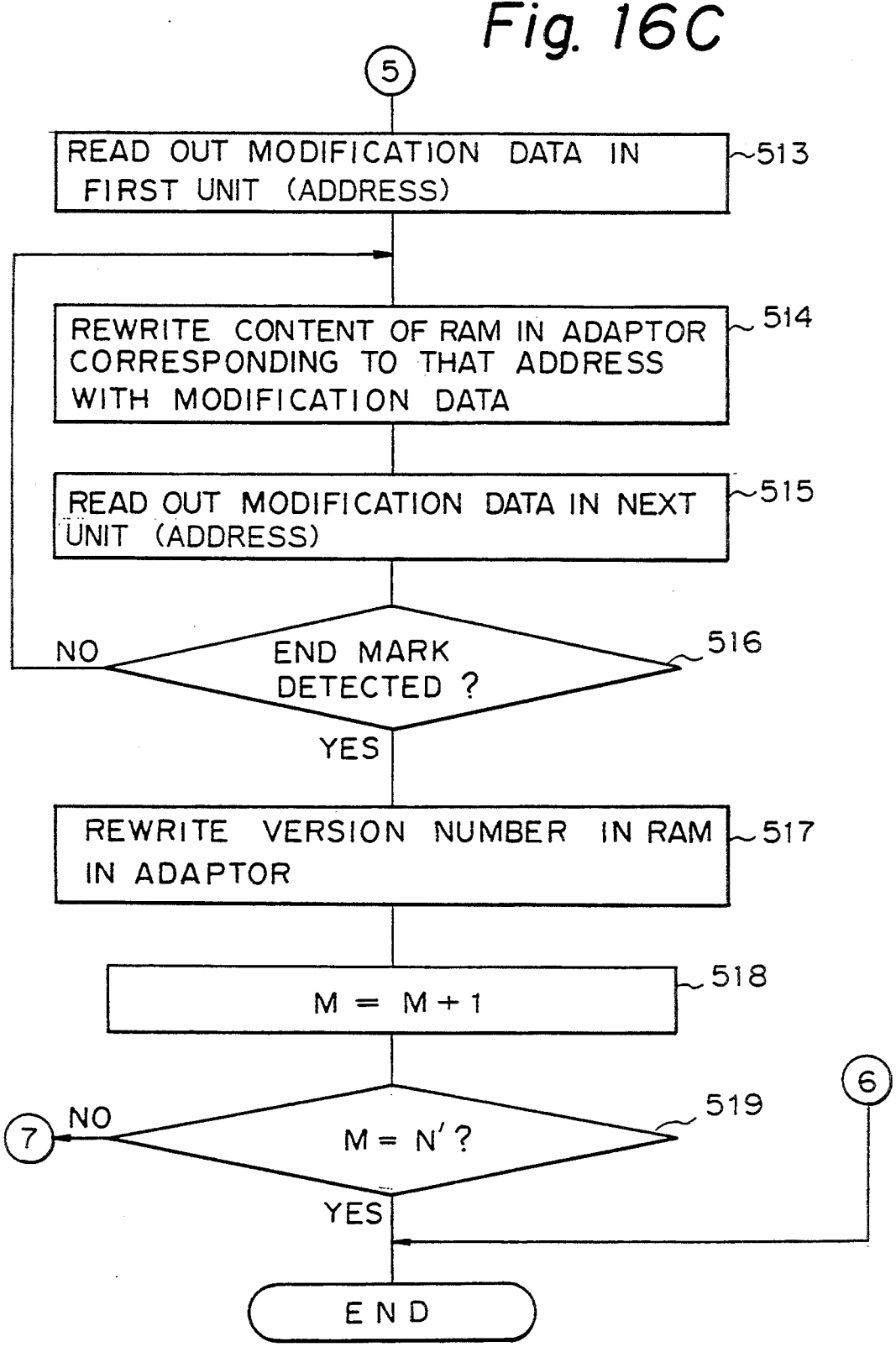

FIRMWARE MODIFICATION SYSTEM WHEREIN OLDER VERSION CAN BE RETRIEVED

This application is a continuation of application Ser. No. 07/748,922, filed Aug. 23, 1991, now abandoned.

BACKGROUND OF THE INVENTION

Field of the Inventon

The present invention relates to a firmware modification system in a data processing apparatus. The functions of one or more pieces of equipment in a data processing system are often realized by firmware, i.e., the equipment contains a microprocessor and a read-only-memory (ROM), and software which determines fixed functions of the equipment is written or stored in advance in the ROM.

Description of the Related Art

Since firmware is a kind of software, a modification thereof for upgrading the firmware or correcting a bug therein may be required. In large scale and general purpose data processing systems, a service processor and a magnetic disc device are provided therein, and software is read by the service processor from the magnetic disc device, and is installed in random access memories (RAM) in one or more pieces of equipment in the data processing system when the power of the system is turned on or the system is restarted. Therefore, the service processor manages and controls the modification or correction of the firmware.

In relatively small scale data processing systems, or in a small size piece of equipment such as a peripheral interface adapter, however, firmware is written or stored in advance in a ROM, and therefore, the ROM must be replaced with a new one when the firmware is to be modified or a bug corrected.

The system must be stopped when the ROM is replaced, and further, the work for the replacement is very bothersome, particularly when firmware in a large number of pieces of equipment is to be modified, or a plurality of pieces of equipment is distributed in a large or remote area.

Further, the data processing apparatus may not successfully operate after the modification of the program data, due to a bug included in the modified data, and in the conventional construction using the ROM only, the ROM must be again replaced in this case.

SUMMARY OF THE INVENTION

An object of the present invention is to provide a firmware modification system of a data processing apparatus wherein a modification of firmware can be carried out fast and easily even when the data processing apparatus is located in a remote place, or when the modification must be carried out in a large number of data processing apparatuses, and program data of an older version can be retrieved when the modified program data is not successfully executed.

According to the present invention, there is provided a firmware modification system in a data processing apparatus, comprising: a processor for executing a program; a working program holding unit for holding therein data of the program executed by the processor; a fixed program data storing unit for storing a fixed program data; a modification data storing unit for storing modification data with which the fixed program data is to be modified, where the modification data storing unit is accessible from outside of the data processing apparatus for writing the modification data; a fixed program data loading unit for reading the fixed program data from the fixed program data storing unit, and loading the fixed program data into the working program holding unit to hold the fixed program data therein; and a working program modifying unit for modifying the data of the program held in the working program holding unit, with the modification data stored in the modification data storing unit.

In the above construction of the present invention, the fixed program may include program portions respectively corresponding to the functions of the fixed program data loading unit and the working program modifying unit, and the fixed program data loading unit and the working program modifying unit may be respectively realized by executions of the program portions by the processor.

In the above construction of the present invention, the firmware modification system may further comprise a modification data supply unit, provided outside of the data processing apparatus, for supplying the modification data to be stored in the modification data storing unit.

In the above construction of the present invention, the modification data supply unit may comprise: a modification data holding unit for holding the modification data to be stored in the modification data storing unit; and a transfer command issuing unit for issuing a transfer command to the data processing apparatus; the data processing apparatus further comprises a transfer command receiving unit for receiving the transfer command; the firmware modification system further comprises a modification data transfer unit for reading the modification data from the modification data holding unit, transferring the modification data from the modification data holding unit to the modification data storing unit, and writing the modification data in the modification data storing unit, when the transfer command is received by the transfer command receiving unit.

In the above construction of the present invention, the modification data may contain a plurality of versions of the modification data; the firmware modification system may further comprise a modification version command unit for commanding the working program modifying unit to modify the data of the program held in the working program holding unit with the modification data up to a specific version; and the working program modifying unit may modify the data of the program held in the working program holding unit with the modification data up to the version, in the order of the versions from the oldest to the newest, when receiving the command of the version.

In the above construction of the present invention, the plurality of versions of modification data are stored in the modification data storing unit in a plurality of blocks respectively corresponding to the versions, the blocks are arrayed in the order of the versions from the oldest to the newest, and the modification version command unit commands the version by a number of blocks containing the modification data up to the version.

In the above construction of the present invention, each block for each version contains: an address of each data to be modified; new data of the address for the version; and old data of the address for a version older than the version of the block by one version level; the working program modifying unit modifies the data in the working program holding unit in the order of the versions from the oldest to the newest; and the working program modifying unit further comprising: a data comparing unit for comparing, before modifying the data in the working program holding unit, the old data of each address and the data of the same address in the working program holding unit; and an abnormal stop unit for stopping the modifying operation when the old data of each address and the data of the same address in the working program holding unit are determined by the data comparing unit to be not equal.

In the above construction of the present invention, each block of the modification data contains first information indicating a version of the program data up to which version the program data held in the working program holding unit is modified with modification data of the block; the working program holding unit contains an area holding second information indicating a version of program data which is currently held therein; the working program modifying unit renews the second information indicating the version of program data, based on the first information when the program data held in the working program holding unit is modified with the modification data in each block.

In the above construction of the present invention, the working program modifying unit comprises a version confirming unit for determining whether or not the version of the program data in the working program holding unit corresponds to a version up to which version the program data held in the working program holding unit is modified with modification data of each block, based on the first and second information, before the program data held in the working program holding unit is modified with the modification data in each block.

BRIEF DESCRIPTION OF THE DRAWINGS

In the drawings;

FIG. 7 is a diagram showing an example format of the header area in the modification data stored in the EEPROM in the construction of FIG. 4;

FIGS. 8A and 8B are diagrams indicating two types of each unit of the modification data in the modification data area in the modification data stored in the EEPROM in the construction of FIG. 4;

FIG. 9 is a diagram showing an example of an end mark;

FIG. 11 is a diagram showing typical examples of an function code;

FIGS. 13A, 13B, and 13C comprise a flowchart of a detailed operation by the processor for transferring modification data to the adapter;

FIGS. 14A, 14B, 14C, and 14D comprise a flowchart of a detailed operation by the adapter for transferring modification data thereto;

DESCRIPTION OF THE PREFERRED EMBODIMENTS

Basic Operations

Before describing the preferred embodiment of the present invention, the basic operations of the present invention are first explained below.

Figure 1:
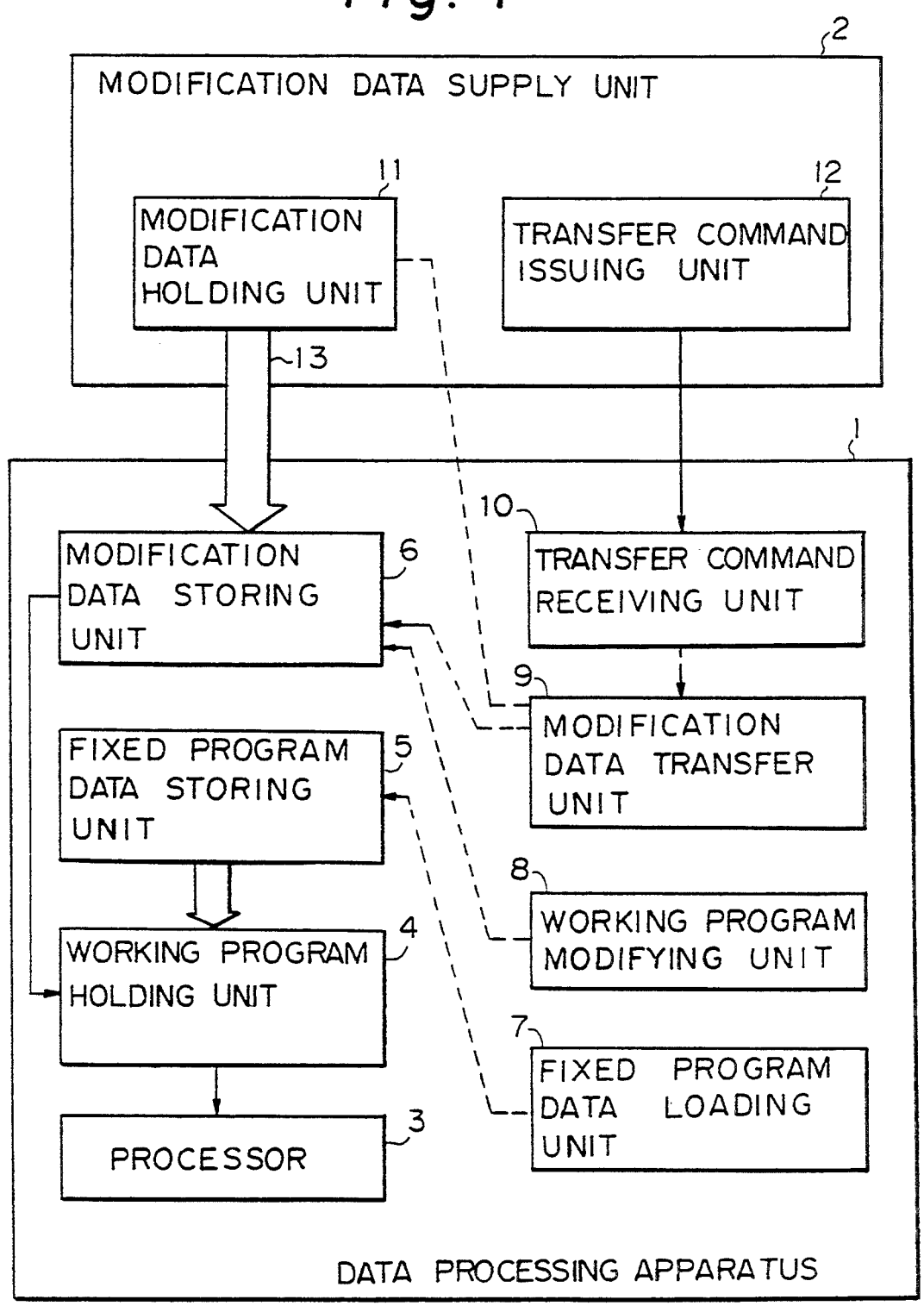
FIG. 1 is a diagram of the basic construction of the present invention.

FIG. 1 is a diagram of the basic construction of the present invention. In FIG. 1, reference numeral 1 denotes a data processing apparatus, 2 denotes a modification data supply unit, 3 denotes a processor, 4 denotes a working program holding unit, 5 denotes a fixed program data storing unit, 7 denotes a fixed program data loading unit, 8 denotes a working program modifying unit, 9 denotes a modification data transfer unit, 10 denotes a transfer command receiving unit, 11 denotes a modification data holding or storing unit, 12 denotes a transfer command issuing unit, and 13 denotes a modification data transfer path.

Among these elements, the processor 3, the working program holding unit 4, the fixed program data storing unit 5, the modification data storing unit 6, the fixed program data loading unit 7, and the working program modifying unit 8 in the data processing apparatus 1 are indispensable constituents of the broadest scope of the present invention.

According to the above broadest scope of the present invention, the fixed program data (version 0 data) is stored in the fixed program data storing unit 5 and the modification data with which the fixed data is to be modified is stored in the modification data storing unit 11, where the modification data storing unit is accessible from outside of the data processing apparatus for writing the modification data therein. The fixed program data is read from the fixed program data storing unit 5 by the fixed program data loading unit 7, and is loaded in the working program holding unit 4, to be held therein, and then the data of the program held in the working program holding unit 4, is modified with the modification data stored in the modification data storing unit 11, by the working program modifying unit 8. Namely, the fixed program data (version 0 data) is permanently retained in the fixed program data storing unit 5. Therefore, even when it turns out that the modified program data cannot be successfully executed, the fixed program data can be retrieved by the working program holding unit 11. In addition, since the modification data storing unit is writable from outside of the data processing apparatus, program data of an older version can be retrieved when the modified program data is not successfully executed.

In the above construction each block for each version contains: an address of each data to be modified; new data for the address for the version; and old data for the address for a version older than the version of the block by one version level, the working program modifying unit 8 modifies the data in the working program holding unit 4 in the order of the versions from the oldest to the newest, the data comparing unit in the working program modifying unit 4 compares, before modifying the data in the working program holding unit 4, the old data of each address and the data of the same address in the working program holding unit 4. The modifying operation is stopped by an abnormal stop unit when the old data of each address and the data of the same address in the working program holding unit 4 are determined by the data comparing unit to be not equal.

The remaining elements in FIG. 1 other than the above indispensable constituents operate respectively as described in the "SUMMARY OF THE INVENTION".

Figure 2:
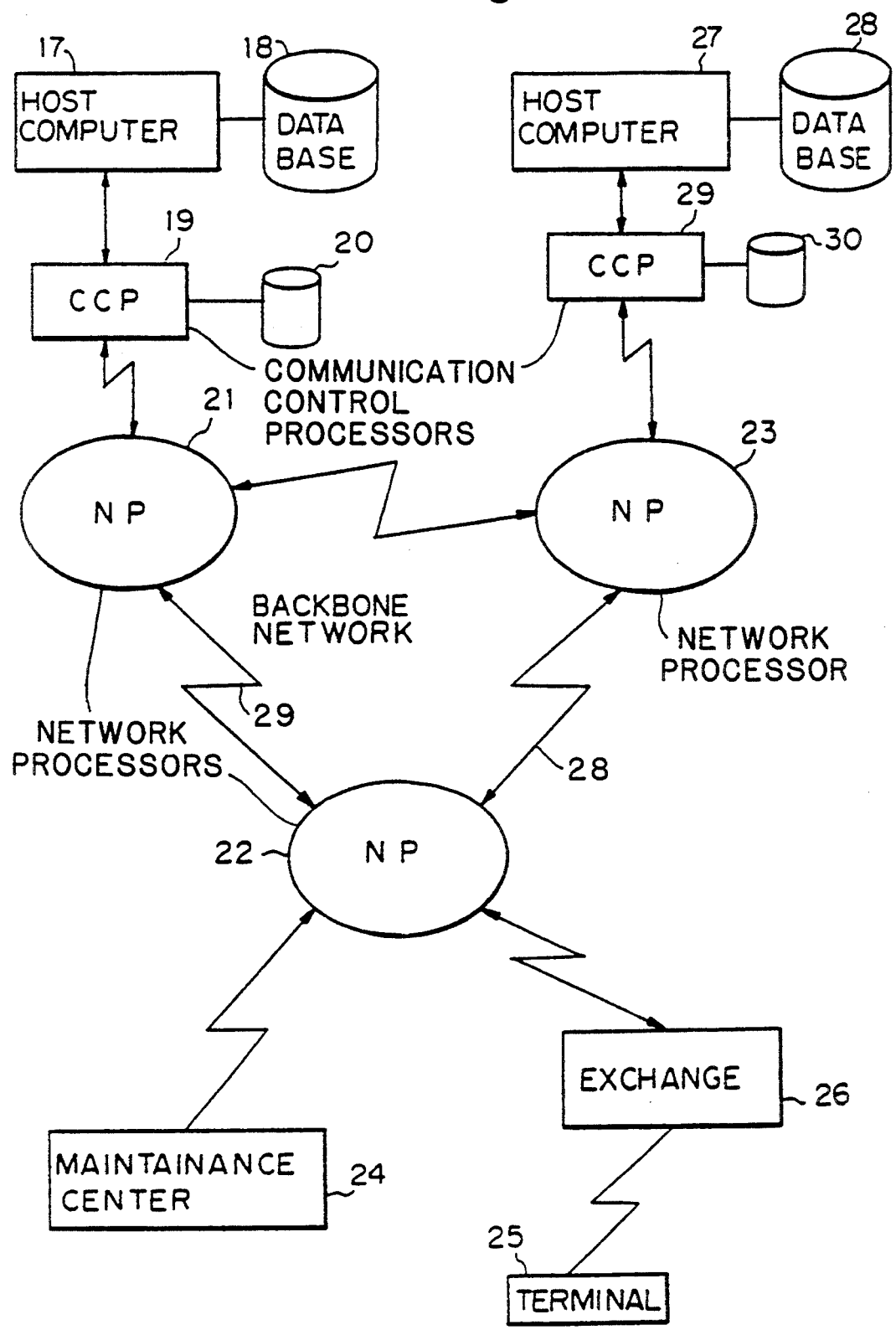
FIG. 2 is a diagram showing an example construction of a distributed data processing system where the present invention can be applied to the communication control processors.

FIG. 2 (Example System to which Present Invention is Applied)

FIG. 2 is a diagram showing an example construction of a distributed data processing system wherein the present invention can be applied to the communication control processors 19 and 29. The distributed data processing system of FIG. 2 may be a data processing system used by a bank, a credit corporation, an insurance company, or a supermarket chain, each having a plurality of branches distributed over a large area.

In FIG. 2, reference numeral 17 and 27 each denote a host computer, 18 and 28 each denote a date base, 19 and 29 each denote a communication control processor, 20 and 30 each denote an auxiliary storage device, 21, 22, and 23 each denote a network processor, 24 denotes a maintenance center, 25 denotes a piece of terminal equipment, 26 denotes an exchange system, and 27, 28, and 29 each denote a transmission line.

The network processors 21 to 23 and the transmission lines 27 to 29 constitute a backbone network, and the network processors are located in respective nodes of the network. Although only three network processors 21 to 23 and the three transmission lines 27 to 29 are shown in FIG. 2, usually, the backbone network can be constructed in an arbitrary form. In addition, the above nodes may be located at the above branches.

The host computer 17, the data base 18, the communication control processor 19, and the auxiliary storage device 20 may constitute an information center, for example, which controls information on customers in an area, and the host computer 27, the data base 28, the communication control processor 29, and the auxiliary storage device 30 may also constitute another information center which controls information on customers in another area. The communication control processor 19 or 29 controls communications of data between the corresponding host computer and the backbone network. As is well known, the function of the communication control processor includes: transformation of data format; establishing and release of data links; monitoring transmission lines; error detection; data buffering; data transfer control between the host computer and communication control processor; and the like.

The maintenance center 24 is connected to one of the network processors 21 to 23, and the exchange system 26 is connected to that network processor 22 in the construction of FIG. 2. Alternately, the exchange 26 may be connected to the other network processor when the network processor is located at the exchange. The terminal equipment 25 may be provided, for example, at each branch office of the bank, and connected to the exchange 26 through a transmission line, whereby, for example, an operator in a branch office can send information from the information center through the terminal equipment, the exchange 26, and the backbone network.

Figure 3:
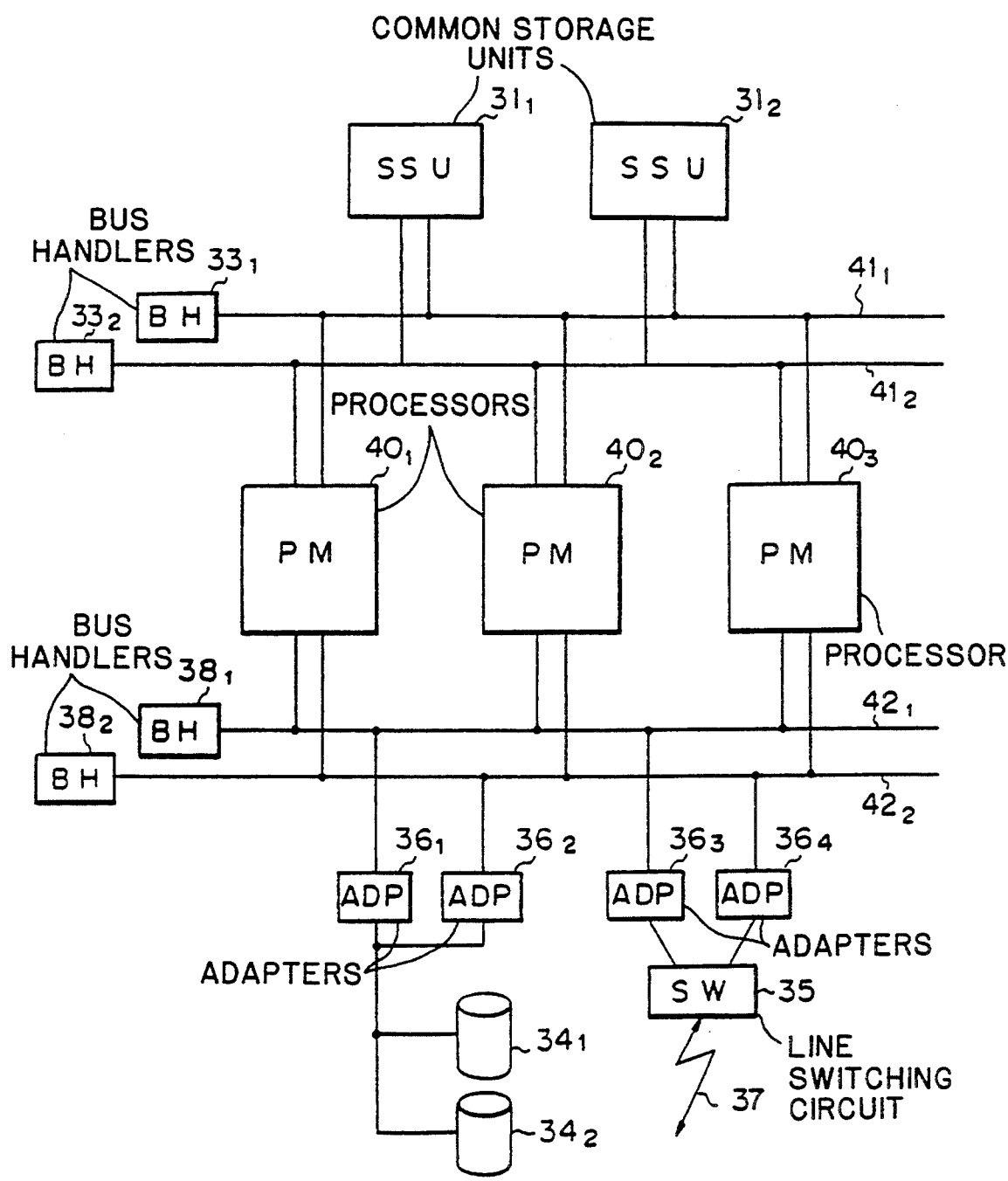
FIG. 3 is a diagram showing the construction of a communication control processor according to an embodiment of an present invention.

FIG. 3 (Communication Control Processor)

FIG. 3 is a diagram of the construction of a communication control processor according to the embodiment of the present invention. In FIG. 3, reference numerals $31_1$ and $31_2$ each denote a common storage unit, $33_1$, $33_2$, $38_1$, and $38_2$ each denote a bus handler, $34_1$ and $34_2$ each denote an I/O device, for example, an auxiliary storage device, 35 denotes a line switching circuit, $36_1$, $36_2$, $36_3$, and $36_4$ each denote an adapter, 37 denotes a transmission line, $40_1$, $40_2$, and $40_3$ each denote a processor, $41_1$ and $41_2$ each denote a system bus, and $42_1$ and $42_2$ each denote an I/O bus.

The communication control processor of FIG. 3 is realized by a loosely-coupled multi-processor construction wherein the above-mentioned functions are shared by the processors $40_1$, $40_2$, and $40_3$. The common storage units $31_1$ and $31_2$ are used for storing data commonly used by the processors $40_1$, $40_2$, and $40_3$. The respective paired provisions of common storage units $31_1$ and $31_2$, the bus handlers $33_1$ and $33_2$, the system buses $41_1$ and $41_2$, the bus handlers $38_1$ and $38_2$, the I/O buses $42_1$ and $41_2$, the adapters $36_1$ and $36_2$, and the adapters $36_3$ and $36_4$ are made for realizing a doubled construction. Either of each pair can be used (activated) under the control of the processors $40_1$, $40_2$, and $40_3$. For example, the line switching circuit 37 is controlled to connect the transmission line 37 with the activated one of the adapters $36_3$ and $36_4$. The transmission line 37 is, for example, connected to the network processor 21 of FIG. 2. The adapters $36_3$ and $36_4$ each operate as a line interface circuit between the processors $40_1$, $40_2$, and $40_3$ and the transmission line 37, and the adapters $36_1$ and $36_2$ each operate as an I/O interface circuit between the processors $40_1$, $40_2$, and $40_3$ and the I/O devices $34_1$ and $34_2$. In this embodiment, the adapters $36_1$, $36_2$, $36_3$, and $36_4$ each correspond to the aforementioned data processing apparatus 1 in FIG. 1, and the processors $40_1$, $40_2$, and $40_3$ realize the aforementioned modification data supply unit 2 in FIG. 1.

FIG. 4 (Adapter)

Figure 4:
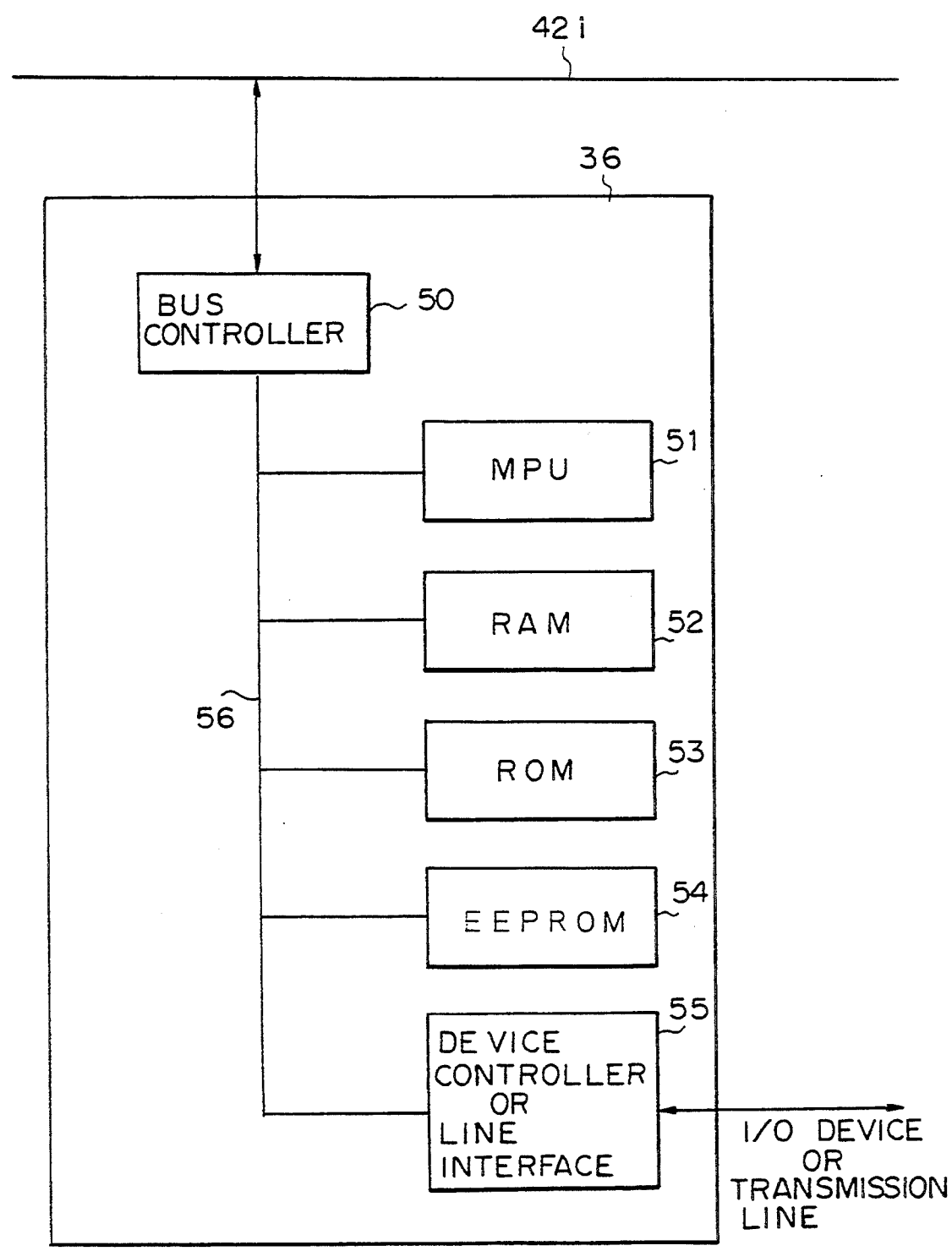
FIG. 4 is a diagram showing the construction of the adapter in the communication control processor according to the embodiment of the present invention.

FIG. 4 is a diagram showing the construction of the adapter 36 in the communication control processor according to the embodiment of the present invention. In FIG. 4, reference numeral $42i$ (i=1 and 2) denotes one of the above-mentioned I/O buses $42_1$ and $42_2$, $36j$ (j=1, 2, 3, or 4) denotes one of the above-mentioned adapters $36_1$, $36_2$, $36_3$, and $36_4$, 50 denotes a bus controller, 51 denotes a microprocessor unit (MPU), 52 denotes a random access memory (RAM) which is a volatile memory, 53 denotes a read only memory (ROM) which is a nonvolatile, nonwritable memory, 54 denotes an electrically erasable programmable ROM (EEPROM), 55 denotes a device controller, or a line interface circuit, and 56 denotes a local bus.

The MPU 51 controls the whole operation of the adapter 36j, and corresponds to the aforementioned processor 3 in FIG. 1. The RAM 52 is used as a main memory area (working area) of the MPU 51, and data of a program executed by the MPU 51 is loaded in the RAM 52. The RAM 52 corresponds to the aforementioned working program holding unit 4 in FIG. 1. The ROM 53 stores fixed data of the program as program data of version zero, and corresponds to the aforementioned fixed program data storing unit 5 in FIG. 1. Any of the processors $40_1$, $40_2$, and $40_3$ can write modification data in the EEPROM 54 with the aid of the MPU 51, as explained later. The modification data is used for modifying data of the program held in the RAM 52.

The program data of version zero includes a program portion for initial program loading. The program portion is comprised of: a first routine for reading the program data of version zero from the ROM 53, and transferring the program data to the RAM 52 to load the program data in the RAM 52; and a second routine for modifying the data of the program held in the RAM 52, with the modification data held in the EEPROM 54, as explained later.

When the power of the adapter 36j is turned ON, or the adapter receives a command to carry out an initial program loading operation (IPL), as explained later, the operation of the MPU 51 is jumped to a top address of an area, in the ROM 53 where the above first routine is stored, and thus the above first routine is executed by the MPU 51. Then, the operation goes to an area in the ROM 53 where the above second routine is stored. When modification data is held in the EEPROM 54, and when the modification is requested by any of the processors $40_1$, $40_2$, and $40_3$, the above second routine is executed by the MPU 51.

The device controller, or the line interface circuit 55 is provided as an interface circuit between the local bus 56 and the I/O devices $34_1$ and $34_2$, or the transmission line 37, respectively. The bus controller 50 operates as an interface circuit between the adapter 36j and the I/O bus 42i. The functions of the bus controller 55 include: reception of a command from any one of the processors $40_1$, $40_2$, and $40_3$; transfer of the received command to the MPU 51; buffering of data to be transferred between one of the processors $40_1$, $40_2$, and $40_3$ and the I/O devices $34_1$ and $34_2$, or the transmission line 37; buffering of the modification data to be transferred from one of the processors $40_1$, $40_2$, and $40_3$ to the EEPROM 54; obtaining a right to access a memory (not shown) in any of the processors $40_1$, $40_2$, and $40_3$; transfer of the modification data from the memory in one of the processors $40_1$, $40_2$, and $40_3$ to the bus controller 50; and transfer of the modification data from the bus controller 50 to the EEPROM 54. The above transfer operations of the modification data are realized by DMA (direct memory access) operations, i.e., the bus controller 50 comprises a DMA controller. The above function of access to a memory (not shown) in any of the processors $40_1$, $40_2$, and $40_3$ is used, for example, when transferring the modification data from the memory in the processor to the bus controller 50.

Figure 5:
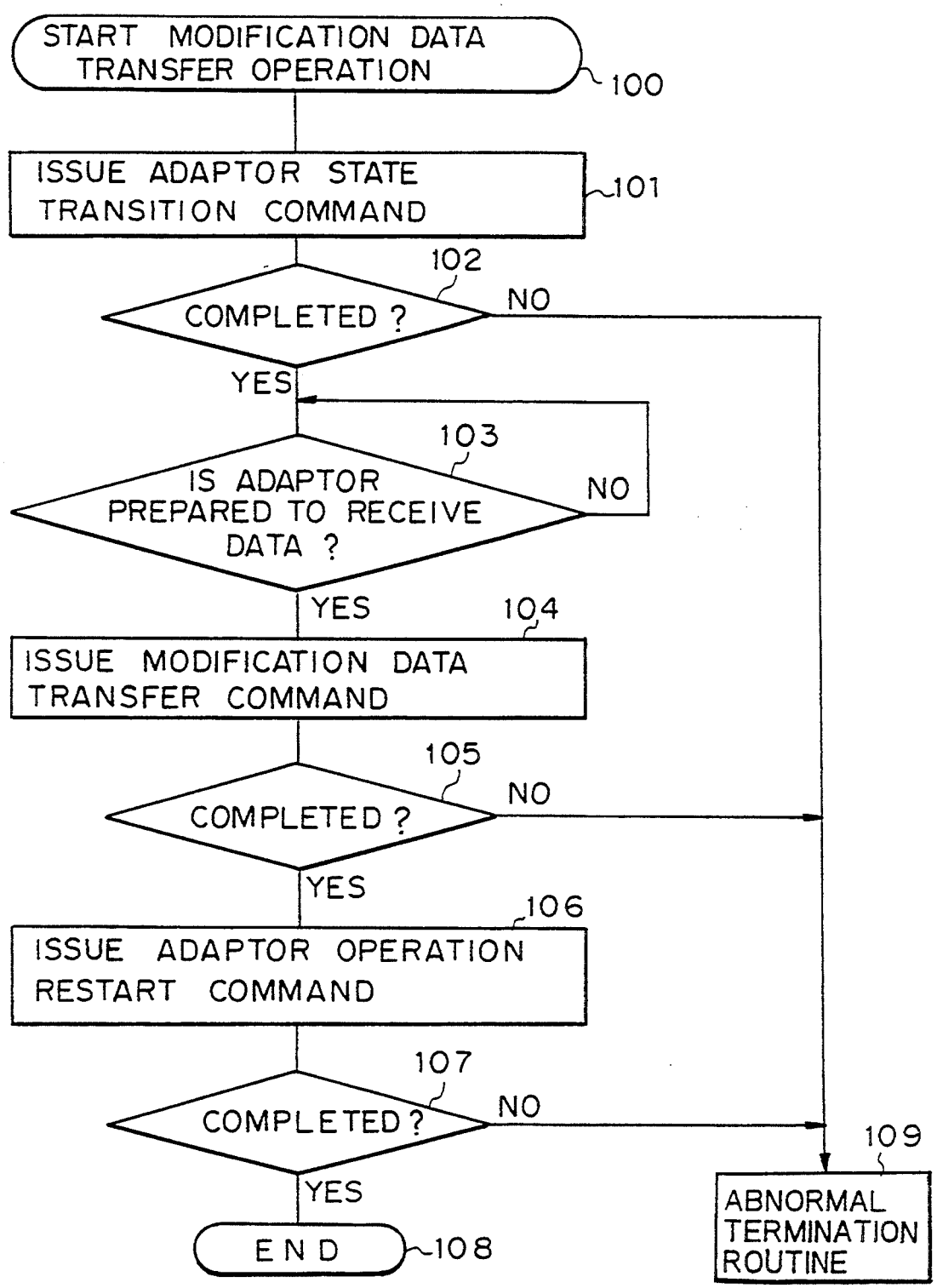
FIG. 5 is a flowchart indicating an operation by the processor for transferring modification data to the adapter.

FIG. 5 (Operation of Processor)

In the distributed data processing system of FIG. 2, the modification data with which the program data of the program in the RAM 52 of FIG. 4 is to be modified, is transferred from the maintenance center 24 to one of the processors $40_1$, $40_2$, and $40_3$ in the communication control processor 19 or 29, through the backbone network. The transferred modification data is held in a memory (RAM, not shown) in the processor. When receiving the modification data, the processor carries out the operation of FIG. 5 to transfer the modification data to the adapter 36i. FIG. 5 is a flowchart indicating an operation by the processor for transferring modification data to one of the adapters $36_1$, $36_2$, $36_3$, and $36_4$. The processor $40_1$, $40_2$, or $40_3$ in the communication control processor 19 or 29 may transfer the modification data to the adapters $36_1$, $36_2$, $36_3$, and $36_4$ only when the processor receives a request to transfer same or when a processing load on the processor becomes small after the above reception of the modification data.

In step 101, the processor issues an adapter state transition command to the adapter, and in step 102 it is determined whether or not the execution of the adapter state transition command is successfully completed. When it is determined that the operation is not successfully completed in step 102, the operation goes to step 109 to execute an abnormal end (abnormal termination) routine. When it is determined that the execution of the adapter state transition command is successfully completed in step 102, the operation goes to step 103. The above adapter state transition command is first received at the bus controller 50 in the adapter, and then, the bus controller 50 supplies an interrupt signal corresponding to the adapter state transition command to the MPU 51. In response to the interrupt signal, the MPU 51 executes a routine to bring the adapter to a state whereby the adapter is ready to receive the modification data, and returns to the processor of the communication control processor a ready signal indicating that the adapter is ready to receive the modification data. When the processor receives the ready signal in step 103, the operation goes to step 104 to issue a modification data transfer command to the adapter. The details of the operation of the transfer are explained later. In step 105, it is determined whether or not the transfer of the modification data has been successfully completed. When the transfer cannot be successfully completed, the operation goes to step 109 to execute the abnormal end routine, and when it is determined that the transfer is successfully completed, the operation goes to step 106 to issue an adapter operation restart command to the adapter. The adapter operation restart command is first received at the bus controller 50 in the adapter, and then, the bus controller 50 supplies an interrupt signal corresponding to the adapter operation restart command to the MPU 51. In response to the interrupt signal, the MPU 51 executes a routine to bring the adapter to a normal processing state, and returns to the processor of the communication control processor a complete signal indicating that the adapter is in the normal processing state. In step 107, it is determined whether or not the adapter operation restart command is successfully completed. When the above complete signal is not received by the processor in the communication control processor, the operation goes to step 109 to execute the abnormal end routine, and when the above complete signal is received by the processor in the communication control processor, the operation illustrated in FIG. 5 is completed.

FIGS. 6, 7, 8A, 8B, and 9 (Format of Modification Data)

Figure 6:
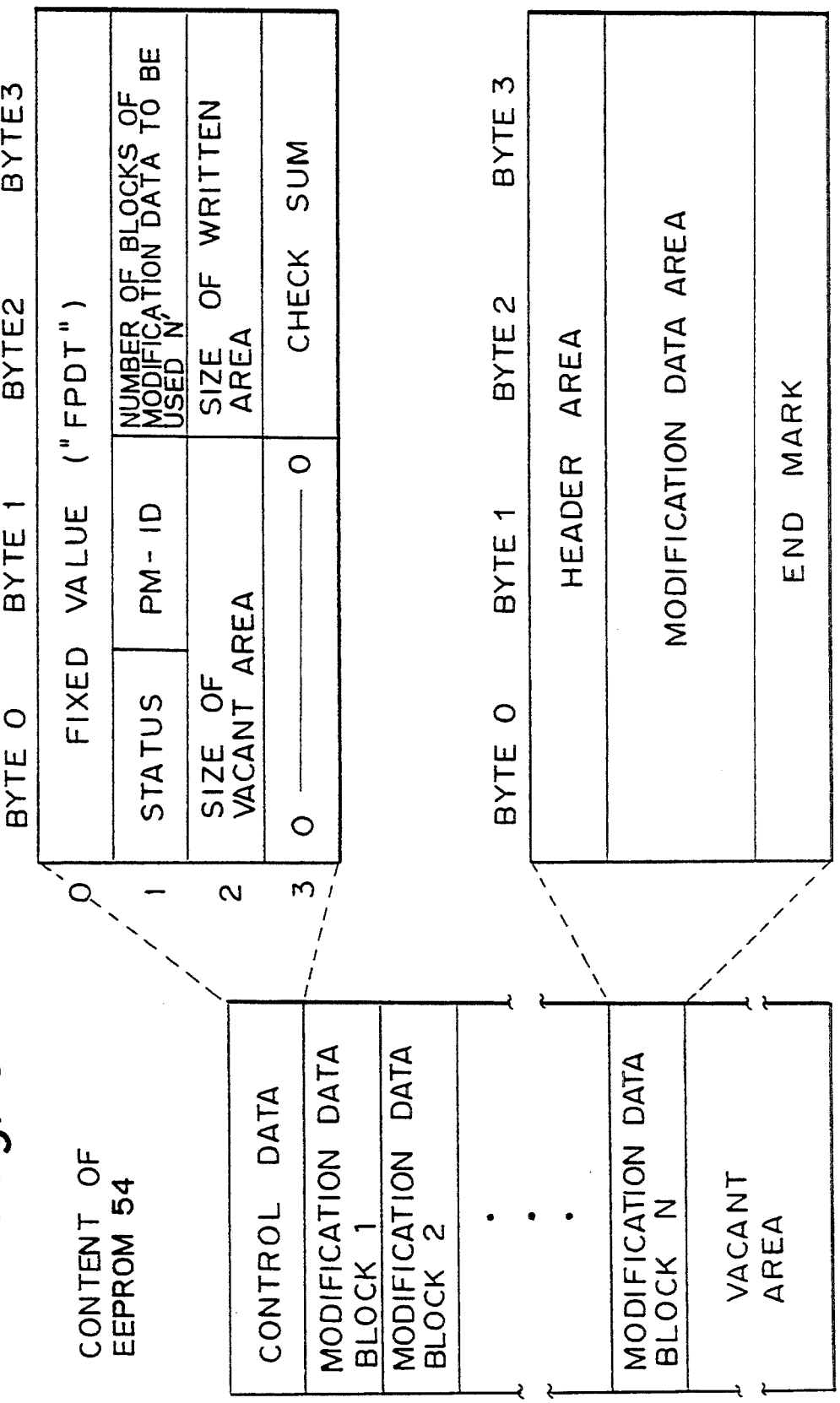
FIG. 6 is a diagram showing an example format of the modification data stored in the EEPROM in the construction of FIG. 4.

FIG. 6 is a diagram showing an example format of the modification data stored in the EEPROM 54 in the construction of FIG. 4. As shown at the left side of FIG. 6, the EEPROM 54 contains control data, a plurality of modification data blocks 1 to N, and a vacant area. The plurality of modification data blocks 1 to N respectively correspond to a plurality of versions of modification data, i.e., a plurality of revisions. The order of the modification data blocks corresponds to the order of the number of the revisions. That is, the modification data block 1 corresponds to the modification data for the first revision 1; the modification data block 2 corresponds to the modification data for the second revision; ... the modification data block N corresponds to the modification data for the N-th revision. As shown at the upper right side of FIG. 6, the area of the control data contains: a fixed value "FPDT (ASCII CODE)" which indicates a top of the area or first addressable location of the control data; a status of the EEPROM 54 which indicates whether or not the EEPROM is protected (closed) against a writing operation ("00" indicates that the EEPROM is protected, and "01" indicates that the EEPROM is open (not protected) for a writing operation); an identification number PM-ID which indicates the processor in the communication control processor which supplies the commands to the adapter; a number N' of modification data blocks to be used for modification; the size of the vacant area (the remaining area) of the EEPROM 54; the size of the area in which the modification data is written in the EEPROM 54; and the check sum which is a sum of all data in the control data and the modification data blocks in the EEPROM 54. As explained later, the above control data except the check sum is supplied from one of the processors $40_1$, $40_2$, and $40_3$ to the adapter.

As shown at the lower right side of FIG. 6, each modification data block contains a header area, a modification data area, and an end mark.

FIG. 7 is a diagram showing an example format of the header area of the modification data block of FIG. 6.

As shown in FIG. 7, the header area contains: a fixed value "DBLK (ASCII CODE)"; a current version of the program data which is held on the RAM 52 in the adapter, and which is to be further modified; a new version of the program data into which version the program data held on the RAM 52 is to be modified with the modification data of the above modification data blocks; the size of the modification data block; and a check sum of the data in the modification data block.

In each of the above modification data blocks, the modification data is contained in a plurality of units. FIGS. 8A and 8B are diagrams indicating two types of each unit of the modification data in the modification data area in the modification data stored in the EEPROM in the construction of FIG. 4. In the type of FIG. 8A, each unit contains old data and new data for two bytes with a corresponding address of the RAM 52. On the other hand, in the type of FIG. 8B, each unit contains new data for four bytes with a corresponding address of the RAM 52. Each unit also contains information which indicates which type the above unit is.

FIG. 9 is a diagram showing an example of the end mark. The end mark is a fixed value "FFFFFFFF".

Figure 10:
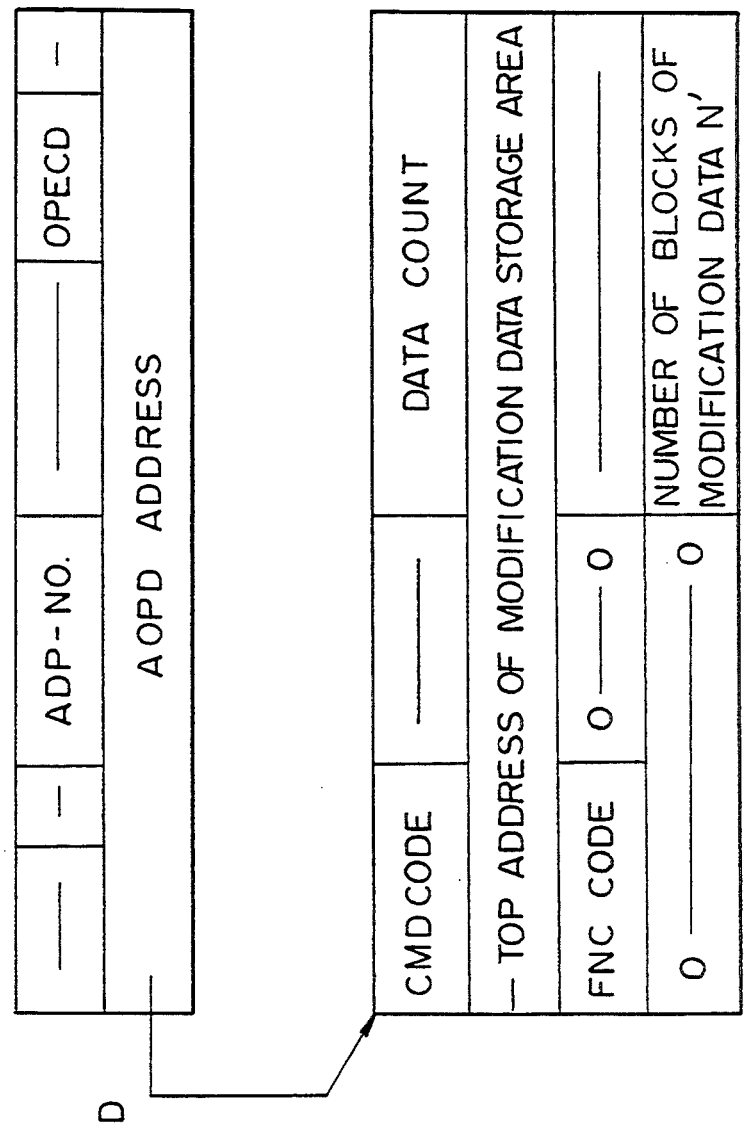
FIG. 10A is a diagram showing a general format of an I/O command.
FIG. 10B is a diagram showing an example format of an adapter operation descriptor AOPD.

FIG. 10A (I/O Command)

FIG. 10A is a diagram showing a general format of an I/O command which is issued to the adapters $36_1$, $36_2$, $36_3$, and $36_4$ from the processors $40_1$, $40_2$, and $40_3$ in the communication control processor. The format of FIG. 10A is used in all commands issued from the processors $40_1$, $40_2$, and $40_3$ to the adapters $36_1$, $36_2$, $36_3$, and $36_4$ through the I/O buses $42_1$ and $42_2$. The format contains: a number ADP-NO. of an adapter to which the I/O command is issued; an operation code OPECD which indicates a type of the command; and an AOPD address. When the I/O command is a command which commands an operation which should be initiated by the MPU 51 in the adapter, the OPECD is indicated as "IAD". The AOPD represents an adapter operation descriptor AOPD, and the AOPD address indicates a top address of an area of the memory (RAM) in the processor at which the adapter operation descriptor AOPD is written.

FIG. 10B (Adapter Operation Descriptor AOPD)

FIG. 10B is a diagram showing an example format of the adapter operation descriptor AOPD. The adapter operation descriptor AOPD of FIG. 10B contains areas for: a command code CMDCODE which indicates a type of an operation requested by the command; a data count DATA COUNT which indicates a number of bytes of the modification data; a top address of modification data storage area (which is explained later); a function code FNC CODE which indicates details of the function of the operation requested by the command; and a number N' of the blocks of the modification data which is to be used for the modification.

When the above AOPD is used for a transfer command of the modification data from one of the processors $40_1$, $40_2$, and $40_3$ to one of the adapters $36_1$, $36_2$, $36_3$, and $36_4$, a command code for the transfer command is set in the above area for the command code CMDCODE, the top address of the modification data storage area is set in the above area for that address, and the number N' of the blocks of the modification data to be used for the modification is set in the above area for the number of the blocks of the modification data.

When the above AOPD is used for an initial program loading command from one of the processors $40_1$, $40_2$, and $40_3$ to the adapters $36_1$, $36_2$, $36_3$, and $36_4$, a command code for the initial program loading command is set in the above area for the command code CMDCODE, and all zero is set in the above area for that address. Another number N' of the blocks of the modification data which is to be used in the execution of the initial program loading command, which number N' is different from the number N' stored in the EEPROM 54 at this time, may be set in the above area for the number N' in the AOPD to carry out a modification based on the new number N' in response to the initial program loading command.

Thus, the processor in the communication control processor can supply the adapter the number N' of modification data blocks which is to be used in the modification of the program data in the RAM 52 in the adapter. Then, the modification of the program data (firmware) can be carried out when an initial program loading command is issued from the processor to the adapter.

Since each modification data block corresponds to one version of the program data, the processor can change the version of the program data in the RAM 52 in the adapter, arbitrarily within the versions zero to N, where N is the number of all modification data block stored in the EEPROM 54. For example, when the processor detects that the adapter does not operate normally with a specific version of the firmware, the processor can change the version to an older version as explained above.

FIG. 11 (Function Code FNC CODE)

FIG. 11 is a diagram showing typical examples of the function code regarding operations for writing in the EEPROM 54 in the adapters. As shown in FIG. 11, the function code FNC CODE is "00" when one of the processors $40_1$, $40_2$, and $40_3$ commands a new writing of modification data in the EEPROM 54; the function code FNC CODE is "01" or "02" when one of the processors $40_1$, $40_2$, and $40_3$ commands a writing of modification data in addition to modification data which has been previously written in the EEPROM 54; the function code FNC CODE is "03" when the processor commands a closing of the EEPROM 54 (That is, to make the EEPROM protected against a writing operation); the function code FNC CODE is "04" when the processor commands a clearing and then closing of the EEPROM 54, and an initializing of the control data; and the function code FNC CODE is "05" when the processor commands a verification of the modification data in the modification data blocks designated in the area of the control data with regard to the block format, consistency of the new and old versions, and the check sum.

Figure 12:
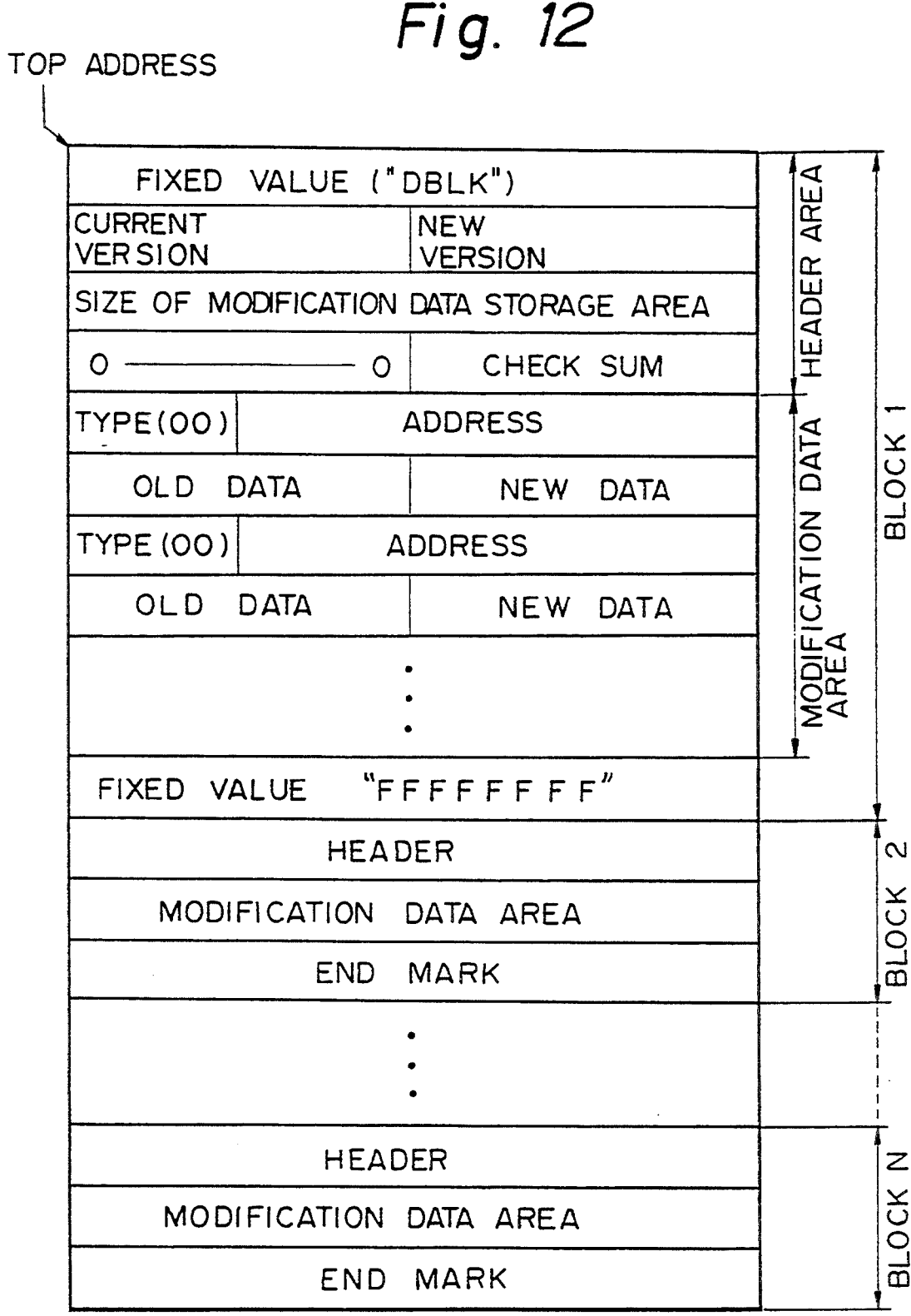
FIG. 12 is a diagram showing an example format of the modification data storage area in a RAM in each of the processors in the communication control processor of FIG. 4.

FIG. 12 (Format of Modification Data Storage Area in RAM)

FIG. 12 is a diagram showing an example format of the modification data storage area which is held in a RAM in one of the processors in the communication control processor of FIG. 4. As shown in FIG. 12, the format of the modification data storage area is the same as the aforementioned format of the modification data in the EEPROM 54 shown in FIG. 6.

Figure 13A:
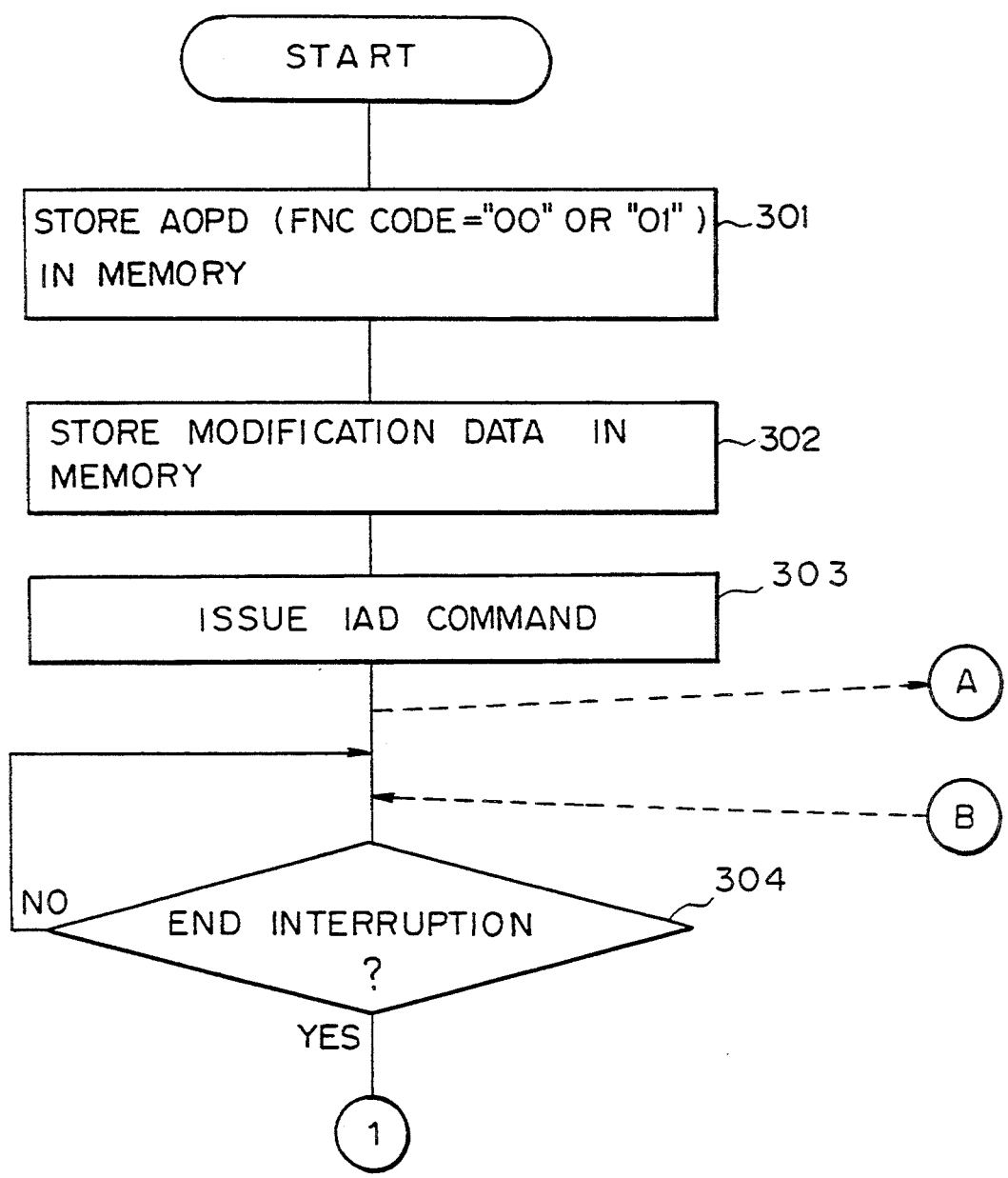
Figure 13C:
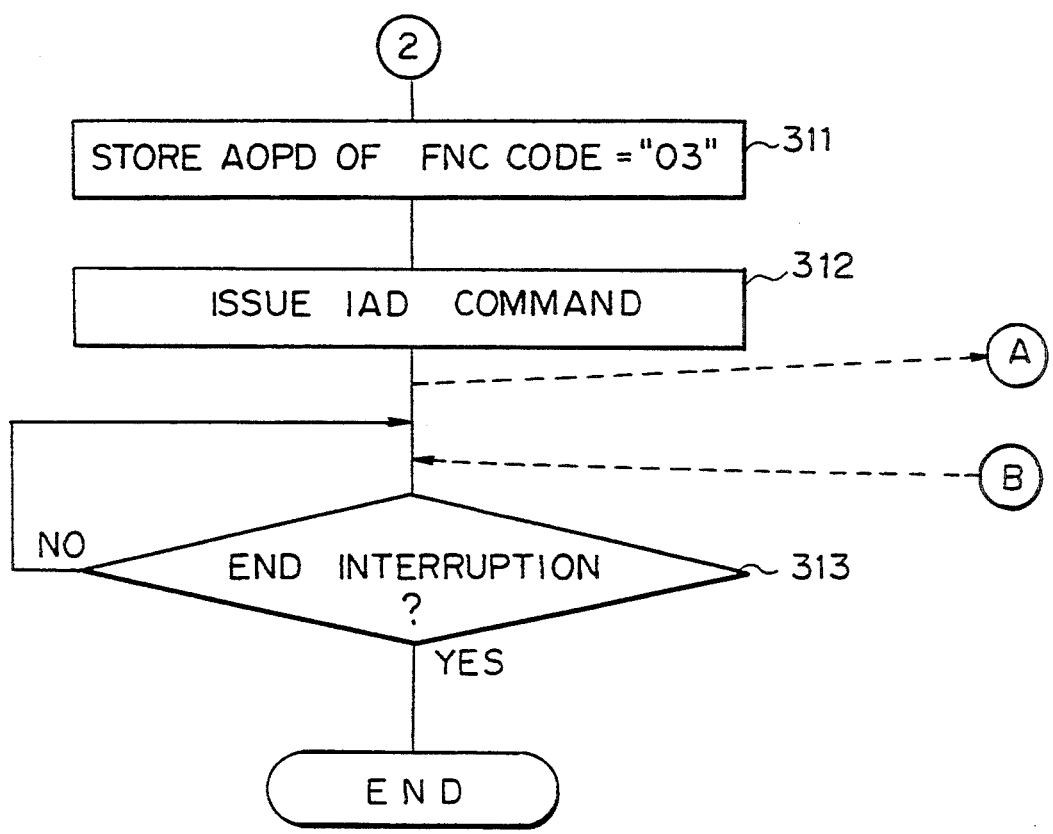

FIGS. 13A, 13B, and 13C (Detailed Operation by Processor for Transferring Modification Data to Adapter)

FIGS. 13A, 13B, and 13C are a flowchart of a detailed operation of the processor for transferring modification data to the adapter.

Figure 14A:
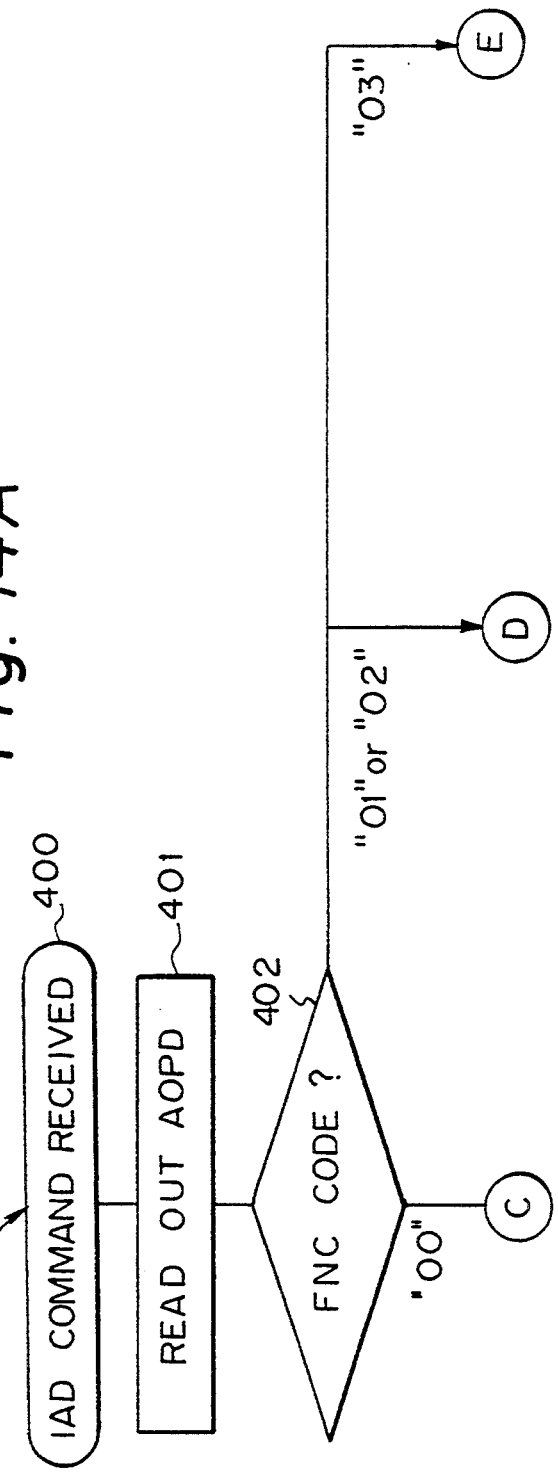

In step 301, the processor stores an AOPD in the memory which is provided therein, where the above function code FNC CODE is set as "00" or "01". Then, in step 302, the processor stores modification data in the memory. In step 303, the processor issues an IAD command (an I/O command wherein the operation code OPECD is set as "IAD"). The dashed lines and the encircled symbols "A" and "B" indicate relationships between the corresponding operations in the adapter which are shown in FIGS. 14A, 14B, and 14C.

Figure 14D:
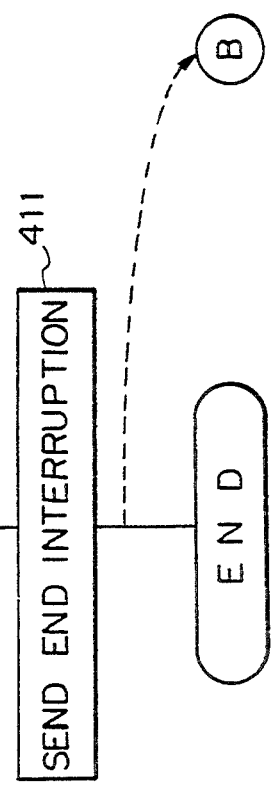

In step 304, it is determined whether or not an end interrupt signal is received. As explained later with reference to FIG. 14D, the adapter returns an end interrupt signal to the processor when an operation for an IAD command is completed. When it is determined that the end interrupt signal is received, the operation goes to step 305 of FIG. 13B. In step 305, it is determined whether or not the processor has further (additional) modification data to be transferred to the adapter. When it is determined that the processor has further modification data, the operation goes to step 306, and when it is determined that the processor has no additional modification data, the operation goes to step 311 of FIG. 13C.

In step 306, the processor stores in the memory therein an AOPD wherein the function code FNC CODE is set as "02", and then stores the additional modification data in the memory in step 307. Next, in step 308, the processor issues an IAD command for transferring the additional modification data to the adapter.

In step 309, it is determined whether or not an end interrupt signal is received, and when it is determined that the end interrupt signal is received, the operation goes to step 310. In step 310, it is determined whether or not the processor has further (additional) modification data to be transferred to the adapter. When it is determined that the processor has further modification data, the operation goes back to step 306, and when it is determined that the processor has no additional modification data, the operation goes to step 311 of FIG. 13C.

In step 311, the processor stores an AOPD wherein the function code FNC CODE is set as "03", and then issues an IAD command to the adapter for closing the EEPROM 54. Then, when an end interrupt signal is received in step 313, the operation of FIGS. 13A to 13C is completed.

FIGS. 14A, 14B, 14C, and 14D (Detailed Operation by Adapter for Transferring Modification Data)

FIGS. 14A, 14B, 14C, and 14D are a flowchart of a detailed operation of the adapter for transferring modification data thereto.

The operation of 14A, 14B, 14C, and 14D starts when an IAD command is received by the adapter from one of the processors $40_1$, $40_2$, and $40_3$ in step 400. In step 401, the MPU 51 reads out the AOPD (adapter operation descriptor) through the bus controller 50 from the memory in the processor which issued the IAD command. The AOPD address in the IAD command shown in FIG. 10A is used in the reading operation. The data of the AOPD is transferred to the adapter by using the DMA function of the bus controller 50. In step 402, the next step is determined according to the function code FNC CODE in the AOPD. When the function code FNC CODE is equal to "00", the operation goes to step 403 in FIG. 14B, when the function code FNC CODE is equal to "01" or "02", the operation goes to step 406 in FIG. 14B, and when the function code FNC CODE is equal to "03", the operation goes to step 410 in FIG. 14C.

In step 403, the MPU 51 reads the content of the modification data storage area (FIG. 12), where the top address of the modification data storage area is read from the above AOPD, and then transfers the modification data to the EEPROM 54 in the adapter. The DMA function of the bus controller 50 is used for the transfer operations between the memory in the processor and the bus controller 50, and between the bus controller 50 and the EEPROM 54.

In this embodiment, the modification data is transferred to the adapter with the aid of the MPU 51 in the adapter through the I/O bus $42_1$ or $42_2$, the bus controller 50, and the local bus 56. Namely, the modification data path 13 in FIG. 1 is realized by the I/O bus $42_1$ or 422, the bus controller 50, and the local bus 56, and the modification data transfer unit 9 in FIG. 1 is realized by the MPU 51 and the bus controller 50.

Then, the transferred data is stored in an area which follows the area of the control data as shown in FIG. 6 in the EEPROM 54 in step 404. Then, the operation goes to step 405 to renew the control data, and store the renewed control data in the EEPROM 54. In the renewing operation, the number N' of the modification data to be used for the modification in the AOPD is written in the area of the control data, the status is set as "open (not protected)", an identification number of the processor which issued the IAD command is set as the number PM-ID, and the sizes of the vacant area and the written area are renewed based on the transferred modification data. Then the operation goes to step 411 in FIG. 14D to send the end interrupt signal to the processor.

In step 406, the MPU 51 reads the content of the modification data storage area, where the top address of the modification data storage area is read from the above AOPD, and then transfers the modification data to the EEPROM 54 in the adapter. The DMA function of the bus controller 50 is used for the transfer operations between the memory in the processor and the bus controller 50, and between the bus controller 50 and the EEPROM 54. The transferred data is stored in an area which follows the area where the modification data is previously stored in the EEPROM 54 in step 407. Then, the operation goes to step 408 to determine whether or not the function code FNC CODE is "01" to "02". When the function code FNC CODE is determined to be "01", the operation goes to the above-explained step 405. When the function code FNC CODE is determined to be "02", the operation goes to step 409. In step 409, the MPU 51 renews the control data, and stores the renewed control data in the EEPROM 54. In the renewing operation, the number N' of the modification data to be used for the modification in the AOPD is written in the area of the control data, the sizes of the vacant area and the written area are renewed based on the transferred modification data. Then the operation goes to step 411 in FIG. 14D to send the end interrupt signal to the processor.

In step 410, the MPU 51 renews the control data, and stores the renewed control data in the EEPROM 54. In the renewing operation, the number N' of the modification data to be used for the modification in the AOPD is written in the area of the control data, the status is set as "closed (protected)", the number of the modification data blocks is renewed or updated, the sizes of the vacant area and the written area are renewed, and the check sum of the data in the area where the modification data is stored is calculated. Then the operation goes to step 411 in FIG. 14D, to send the end interrupt signal to the processor.

FIGS. 15, 16A, 16B, 16C, and 16D (Initial Program Loading in Adapter)

Figure 15:
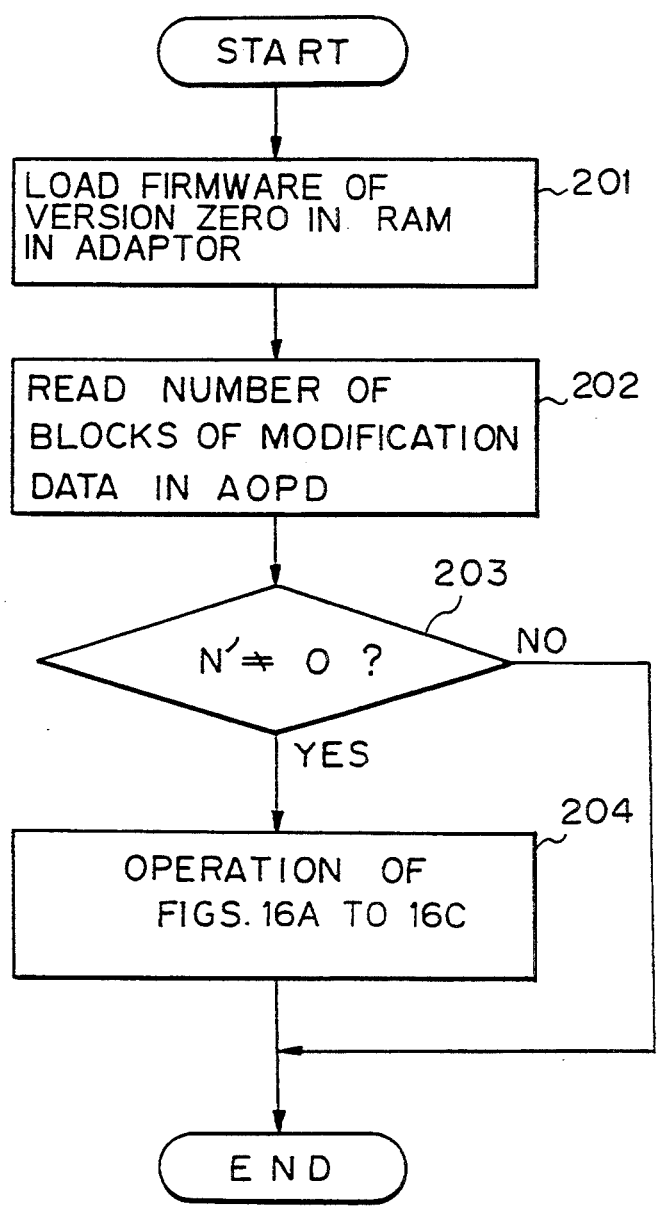
FIG. 15 is a flowchart indicating an operation of the initial program loading in the adapter.

When an initial program loading command is issued to an adapter by one of the processors $40_1$, $40_2$, and $40_3$ in the communication control processor, the adapter executes the process of FIG. 15. FIG. 15 is a flowchart of an operation of the initial program In step 201, the operation goes to a predetermined address of the ROM 53 in the adapter to read out fixed program data (program data of version zero) from the ROM 53, and to load the program data in the RAM 52 in the adapter. Then, in step 202, the MPU 51 reads the number N' of the modification data blocks to be used, from the adapter operation descriptor AOPD to determine whether or not modification data is stored in the EEPROM 54 in step 203. When the number N' is determined to be zero, the operation of FIG. 15 (the initial program loading) is completed. When the number N' is determined not to be zero, the operation goes to step 204 to carry out the operation of FIGS. 16A to 16C for modifying the program data held in the RAM 52. When the operation of FIGS. 16A to 16C is completed, the operation of FIG. 15 is completed.

Figure 16A:
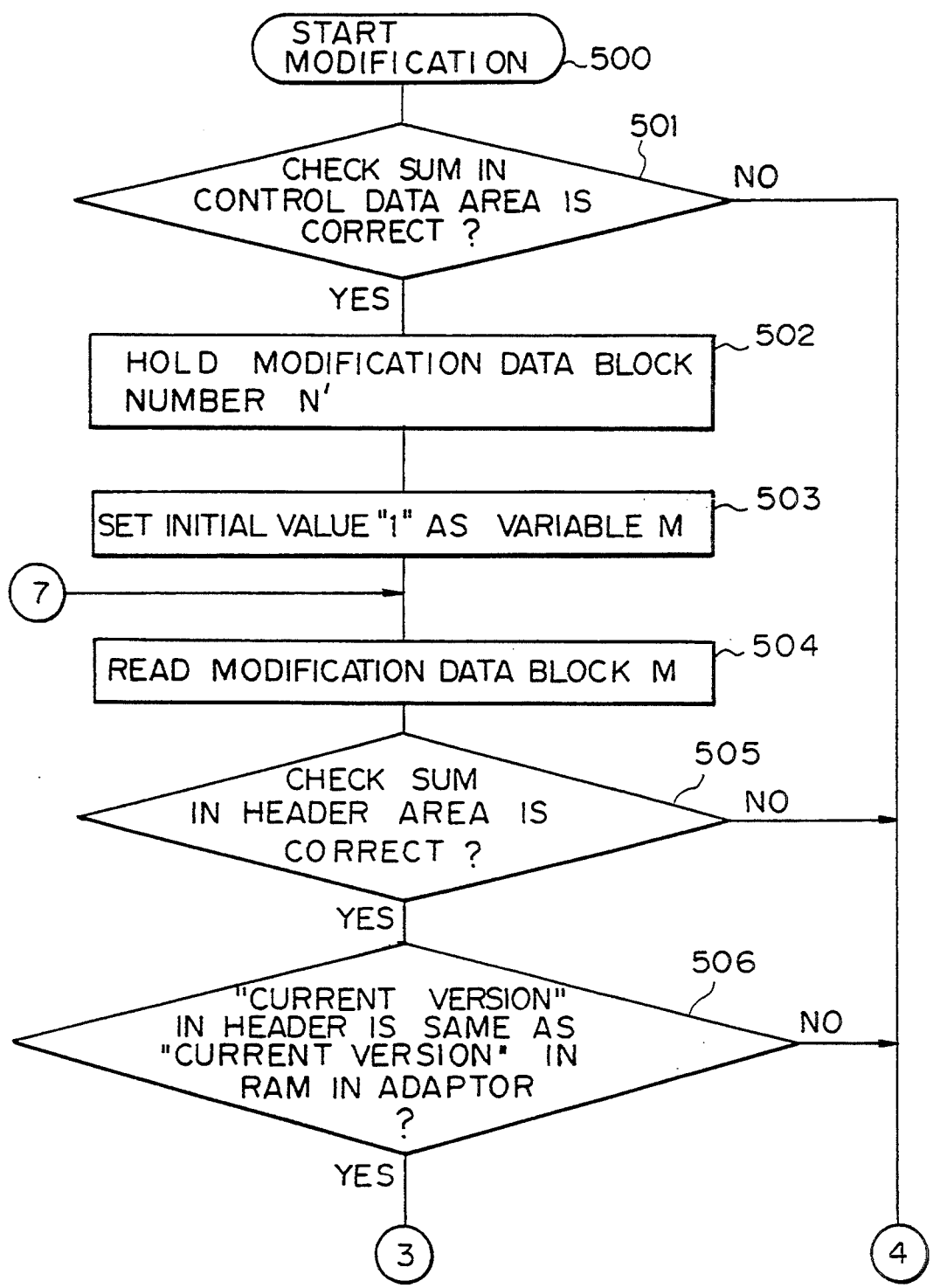
FIGS. 16A, B, and C comprise a flowchart of a detailed operation by the adapter for loading the modification data in the RAM therein.
Figure 16B:
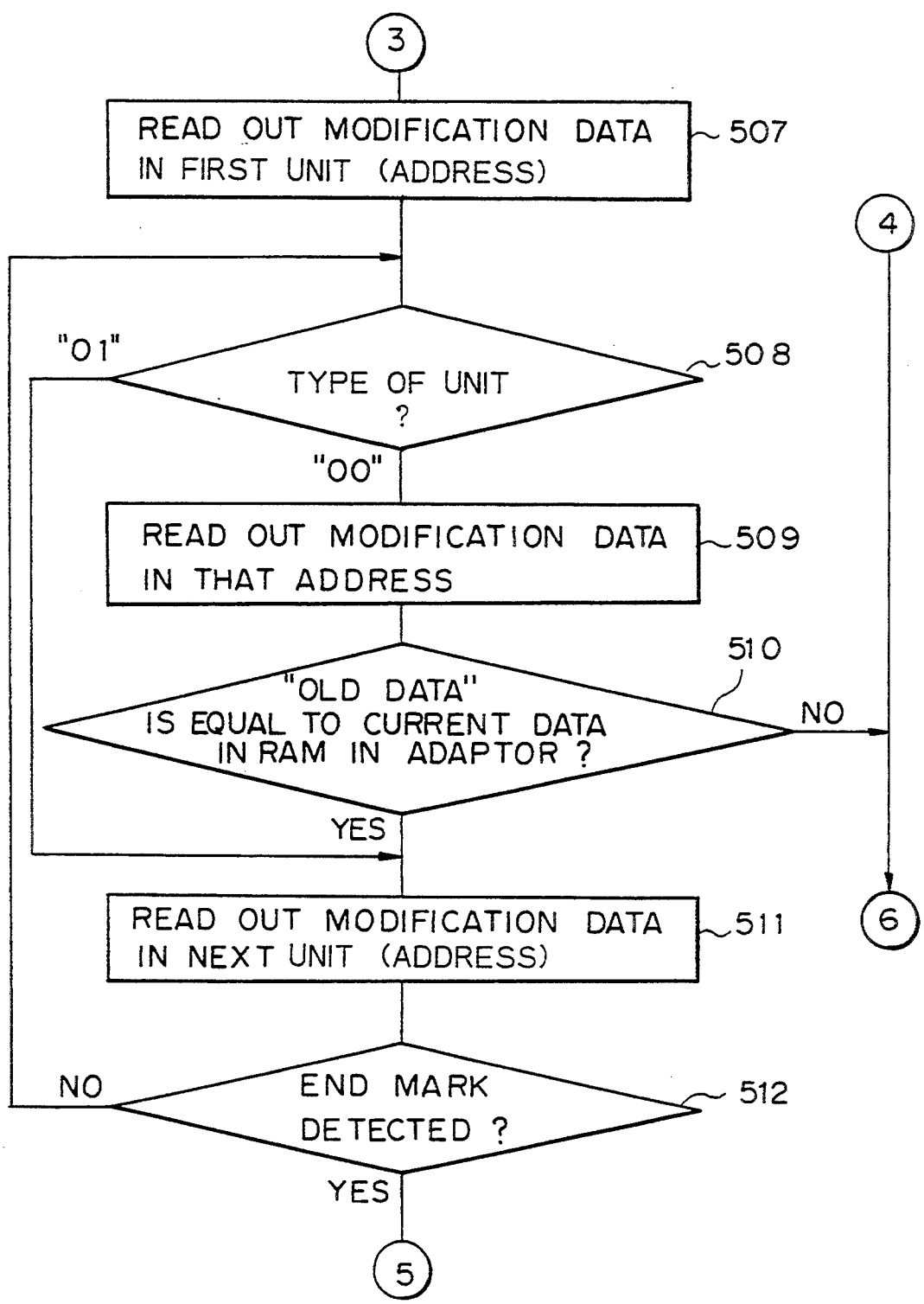

FIGS. 16A, B, and C indicate a flowchart of a detailed operation by the adapter for loading the modification data in the RAM therein.

In step 501 of FIG. 16A, it is determined whether or not the check sum in the control data area is correct. When it is determined that the check sum is not correct, the operation of FIGS. 16A to 16C is completed. When it is determined that the check sum is correct, the operation goes to step 502. In step 502, the MPU 51 holds at a predetermined register therein a number N' of modification data blocks, where the number N' is a maximum number of modification data blocks which are to be used in the operation of modifying the program data in the RAM 52. Namely, the modification is to be carried out by using the modification data corresponding to the block numbers from 1 to the number N'. This number N' can be supplied from the processor in the communication control processor to the adapter by issuing an IAD command such as a transfer command for the modification data, and an initial program loading command using the command formats of FIGS. 10A and 10B, as explained before with reference to FIG. 10B. The above number N' can be contained in the format of the AOPD of FIG. 10B.

Next, in step 503, the MPU 51 sets an initial value "1" as a variable M. Then, the MPU 51 reads a modification data block whose block number is equal to the above variable M from the EEPROM 54, and then it is determined whether or not the check sum in the header area (FIG. 7) in each modification data block is correct, in step 505. When it is determined that the check sum is not correct in step 505, the operation of FIGS. 16A to 16C is completed. When it is determined that the check sum is correct in step 505, the operation goes to step 506 to determine whether or not the information on the "current version" in the header area (FIG. 7) is equal to an indication of "current version" in the content of the RAM 52 in the adapter. As explained later, when the program data held on the RAM 52 is modified with the modification data of each modification data block, a number indicating the new current version is written in a predetermined area of the RAM 52. When it is determined not equal in step 506, the operation of FIGS. 16A to 16C ends (abnormal end). When it is determined equal in step 506, the operation goes to step 507 to read out modification data in the top address (of the first unit) of the modification data block.

In step 508, the above-mentioned type of the modification data of the unit is determined. When the type is determined to be "00" the operation goes to step 509. When the type is determined to be "01" the operation goes to step 511. In step 509, the MPU 51 reads out the program data in the address of the above unit from the RAM 52, as current data, and it is determined whether or not the current data is equal to the old data (FIG. 8A) in the unit in step 510. When it is determined to be not equal in step 510, the operation of FIGS. 16A to 16C is completed. When it is determined equal in step 510, the operation goes to step 511.

In step 511, the MPU 51 reads out modification data in the next unit. Then, in step 512, it is determined whether or not the end mark is detected. When the end mark is detected, the operation goes to step 513. When the end mark is not detected, the operation goes back to step 508 for the operation of the next unit.

In step 513, the MPU 51 reads out modification data in the top address (of the first unit) of the modification data block again from the EEPROM 54. Then, in step 514, the MPU 51 rewrites, in the RAM 52, the program data of the same address as that in the unit, with the modification data of the unit. Then, in step 515, the MPU 51 reads out modification data in the next unit. In step 516, it is determined whether or not the end mark is detected. When the end mark is detected, the operation goes to step 517. When the end mark is not detected, the operation goes back to step 514.

In step 517, the MPU 51 rewrites the information on the above-mentioned number indicating the new current version. Then, in step 518, the above-mentioned variable M is incremented by one. In step 519, it is determined whether or not the above variable M reaches or equals the above number N'. When it is determined that the variable M reaches the number N', the operation of FIGS. 16A to 16C is completed. When it is determined that the variable M does not reach the number N', the operation goes back to step 504 to carry out the modification with the modification data of the next new version.

Other Matters

As explained above, according to the above construction, a modification of firmware can be carried out fast and easily. In addition, for example, as shown in the system of FIG. 2, the transfer of modification data to a remote data processing apparatus and a command to modify program data in a remote data processing apparatus, are possible through the network. Further, it is easy for the processors in the communication control processor to command a number of data processing apparatuses to modify program data in their apparatuses. Namely, the modification can be carried out in a large number of data processing apparatuses.

Another advantage is that program data of an older version can be retrieved when it turns out that modified program data is not successfully executed. For example, in the above embodiment, when one of the processors $40_1$, $40_2$, and $40_3$ in the communication control processor detects a malfunction of the adapters after a modification of the program data up to a first version number, the processor can make the adapter retrieve a second version which is older than the above first version. This is carried out by issuing an IAD command, such as the transfer command for the modification data, and the initial program loading command, using the formats of FIGS. 10A and 10B, to the adapters wherein the number N' of modification data blocks which corresponds to the above older version is set in the aforementioned area for the number N' of modification data blocks in the AOPD of FIG. 10B. Namely, the above number N' is a number of the modification data blocks to be used for modification by which the version of the program data in the RAM 52 is made the above second version. As explained with reference to FIGS. 15 to 16D, when the adapter receives the above initial program loading command, the operations of FIGS. 15 to 16D are carried out, and therefore, the version of the program data in the RAM 52 is made the above second version.

Although, in the above embodiment, the modification data path 13 in FIG. 1 is realized by the I/O bus $42_1$ or $42_2$, the bus controller 50, and the local bus 56, and the modification data transfer unit 9 in FIG. 1 is realized by the MPU 51 and the bus controller 50, the modification data path 13 may be provided, in addition to the local path 50 of FIG. 4, for the processor to directly access the EEPROM 54.

What is claimed is:

1. A program modification system, comprising:
a processor executing a program;
working program holding means for holding the program executed by said processor,
fixed program data storing means for storing an initial version of the program;
modification data storing means for storing modification data, where said modification data storing means is accessible externally for writing the modification data into said modification data storing means;
fixed program data loading means for reading said initial version of the program from said fixed program data storing means, and loading said initial version of the program into said working program holding means;
working program modifying means for modifying the program loaded in said working program holding means using said modification data stored in said modification data storing means where said modification data contains versions of said modification data; and
modification version command means for commanding said working program modifying means to modify the program loaded in said working program holding means with the modification data up to a specific one of the versions; and
said working program modifying means modifying the program held in said working program holding means with the modification data up to the specific one of the versions in an order of the versions from the oldest to the newest when a version command is received.

2. A program modification system according to claim 1, wherein:
a plurality of versions of modification data are stored in said modification data storing means in a plurality of blocks respectively corresponding to the versions, and the blocks are arrayed in the order of the versions from the oldest to the newest; and
said modification version command means indicates the specific one of the versions by indicating a number of blocks containing the modification data up to the specific one of the versions.

3. A program modification system according to claim 2, wherein:
each block of the modification data contains first information indicating a first version of the program up to which first version the program held in said working program holding means is modified with modification data of the block;
said working program holding means contains an area holding second information indicating a second version of the program which is currently held therein; and said working program modifying means updates said second information indicating the second version of the program, based on said first information when the program held in said working program holding means is modified with the modification data in each block.

4. A program modification system according to claim 3, wherein said working program modifying means comprises version confirming means for determining, whether the version of the program in said working program holding means corresponds to a version up to which version the program held in the working program holding means is to be modified with modification data of each block, before the program held in the working program holding means is modified with the modification data in each block.

5. A program modification system, comprising:
a processor for executing a program;
working program holding means for holding therein data of said program executed by said processor;
fixed program data storing means for storing a fixed data of the program;
modification data storing means for storing modification data, where said modification data storing means is accessible externally for writing the modification data into said modification data storing means;
fixed program data loading means for reading said fixed data of the program from said fixed program data storing means, and loading the fixed data of the program into said working program holding means to hold said fixed data of the program in said working program holding means; and
working program modifying means for modifying said data of the program held in said working program holding means using said modification data stored in said modification data storing means, where said modification data contains versions of said modification data; and
modification version command means for commanding said working program modifying means to modify the data of the program held in said working program holding means with the modification data up to a specific one of the versions in an order of the versions from the oldest to the newest when a version command is received;
said plurality of versions of modification data are stored in said modification data storing means in a plurality of blocks respectively corresponding to the versions;
each block for each version contains:
an address of each data which is to be modified;
new data of the address for said each version; and
old data of the address for an older version which is older than said each version of the block by one version
said working program modifying means modifies the data in said working program holding means in the order of the versions from the oldest to the newest; and
said working program modifying means further comprising:
data comparing means for comparing, before modifying the data in said working program holding means with a new version, said old data of the address as stored in the block of the modification data and the data currently contained in the same address in said working program holding means; and
abnormal stop means for stopping the modifying operation when said old data of each address and the data of the same address in said working program holding means are determined to be not equal by said data comparing means.

6. A firmware modification system, comprising:
a non-volatile non-writable firmware memory storing an initial version of a program;
a volatile memory coupled to said firmware memory and into which the initial version of the program is loaded;
a non-volatile writable modification data memory storing modification data comprising modifications to the initial version of the program; and
a processor, connected to said firmware memory, said volatile memory and said data memory, transferring the initial version of the program from said firmware memory to said volatile memory and modifying the initial version of the program responsive to the modifications stored in said data memory, and
wherein said modification data comprises versions having a version order and said processor modifies the initial version of the program using the versions in the version order and said modification data further comprises current program data and replacement program data, and said processor compares the program to the current program data before modifying the program with the replacement program data.

7. A system according to claim 6, wherein when said processor detects a failure in one of the versions, said processor replaces the one of the versions with a prior version.

* * * * *

UNITED STATES PATENT AND TRADEMARK OFFICE
CERTIFICATE OF CORRECTION

PATENT NO. : 5,450,589

DATED : September 12, 1995

INVENTOR(S) : Maebayashi et al.

It is certified that error appears in the above-indentified patent and that said Letters Patent is hereby corrected as shown below:

Column 4, line 49    insert --,-- after "5";
          line 67    "11" should be --4--;
          line 68    after "unit", insert --11--.

Column 6,
          line 68    after ",", insert --which is a nonvolatile, writable memory--.

Column 9, line 51    delete "above";
          line 52    "blocks;" should read --block; --.

Signed and Sealed this

Sixth Day of August, 1996

Attest:

BRUCE LEHMAN

*Attesting Officer*      *Commissioner of Patents and Trademarks*